United States Patent
Okusa et al.

(10) Patent No.: US 6,839,602 B2
(45) Date of Patent: Jan. 4, 2005

(54) DEVICE AND METHOD FOR DESIGNING SHAPED MATERIAL PRODUCTION PROCESS

(75) Inventors: Kazuhiko Okusa, Aichi-ken (JP); Michiyoshi Keta, Toyota (JP); Nobuhiro Takeda, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/320,494

(22) Filed: Dec. 17, 2002

(65) Prior Publication Data

US 2003/0139832 A1 Jul. 24, 2003

(30) Foreign Application Priority Data

Dec. 17, 2001 (JP) ........................................ 2001-383627

(51) Int. Cl.⁷ .............................................. G06F 19/00
(52) U.S. Cl. ........................................ 700/97; 700/159
(58) Field of Search ............................ 700/97, 95, 159

(56) References Cited

U.S. PATENT DOCUMENTS

| | | | | |
|---|---|---|---|---|
| 5,812,402 A | * | 9/1998 | Nishiyama et al. | ........... 700/97 |
| 6,292,707 B1 | * | 9/2001 | Hair et al. | ..................... 700/97 |
| 6,560,499 B1 | * | 5/2003 | Demmer | ...................... 700/97 |
| 2003/0004596 A1 | * | 1/2003 | Landers et al. | ................ 700/98 |
| 2003/0050765 A1 | * | 3/2003 | Sasahara | ...................... 702/155 |
| 2003/0139831 A1 | * | 7/2003 | Takeda et al. | ................. 700/97 |
| 2004/0064211 A1 | * | 4/2004 | Mateau et al. | ................. 700/97 |

FOREIGN PATENT DOCUMENTS

| | | |
|---|---|---|
| JP | 8-147350 | 6/1996 |
| JP | 11-025142 | 1/1999 |
| JP | 2000-099564 | 4/2000 |

* cited by examiner

*Primary Examiner*—Leo Picard
*Assistant Examiner*—Ryan Jarrett
(74) *Attorney, Agent, or Firm*—Finnegan, Henderson, Farabow, Garrett & Dunner, LLP

(57) ABSTRACT

A process for producing a shaped material can be designed in parallel to product designing, thereby reducing a period between initiation of product designing and completion of design of the process for producing the shaped material. A shaped material production process designing device (1) comprises a CPU (21) which includes a design record retrieving section (41) for retrieving a past design record from a design record database (5). Of the past process for producing the shaped material, design data of a standard portion independent from a shape of the product is acquired by a standard portion design data acquiring section (43). A shape dependent portion designing section (45) designs the shaped material production process that depends on the shape of the product. The CPU further includes a process design data editing section (47) for editing the design data of the standard portion and a design result of the shape dependent portion.

4 Claims, 5 Drawing Sheets

DEVICE AND METHOD FOR DESIGNING SHAPED MATERIAL PRODUCTION PROCESS

BACKGROUND OF THE INVENTION

1. Field of the Invention

The present invention relates to a shaped material production process designing device and method for designing a process for producing a shaped material of a product.

2. Description of the Related Art

For mass production of a product, it is common that a product design is first prepared based on target specifications of the product, and that the product is then produced in accordance with the product design. Many products are produced through a shaped material production stage in which a rough product is created from a blank material, and a machining stage in which the shaped material is machined. For the shaped material production stage in which a blank material is first contoured or shaped, a die is designed based on the product design, manufacturing conditions for the model are determined, and the model is manufactured. And shaping apparatuses for pressing, casting, and the like are prepared, and manufacturing conditions, such as shaping conditions, are determined. Using the manufactured die in the prepared apparatuses under the manufacturing conditions, the blank material is then shaped, thereby producing a shaped material. Therefore, such production requires designing and manufacturing of a die, and designing a process for producing a shaped material using the die.

When designing such a production process for a shaped material, conventionally a detailed product design must first be completed before a die can be designed. Conventionally, the setting of manufacturing conditions for the particular die, determination of machines to be used during production, and setting of manufacturing conditions for manufacturing the shaped material from a blank material cannot be begun until the initial product design has been finalized. Further, the manufacturing conditions for manufacturing a die and a shaped material from a blank material are set based on experiences at each manufacturing site.

SUMMARY OF INVENTION

The present invention aims to solve the above-described problems of the related art and to provide a shaped material production process designing device and method that allows a shaped material production process to be designed in parallel to product designing and enables utilization of past experience in designing the shaped material production process, thereby reducing a period between initiation of product designing and completion of design of the shaped material production process.

In order to achieve the above objects, a shaped material production process designing device according to the present invention comprises a process design record memory for storing, in association with a specification including a basic dimension of the product, a design record of the process for producing the shaped material of the product, divided into a standard portion independent from a shape of the product and a shape dependent portion depending on the shape of the product, a retrieving section for retrieving the design record to be referenced corresponding to the specification of the product to be designed, a standard portion design data acquiring section for acquiring design data of the standard portion of the retrieved design record for the standard portion of the production process to be designed, and a shape dependent portion designing section for designing the shape dependent portion of the production process to be designed while referring to design data of the retrieved design record, temporarily determining the production process, and sequentially updating the production process in accordance with the progress of the product, whereby the process for producing the shaped material of the product can be designed.

A shaped material production process designing method according to the present invention comprises a retrieval step of retrieving a design record to be referenced corresponding to a specification of a product to be designed from a design record database for storing, in association with the specification including a basic dimension of the product, the design record of the process for producing the shaped material of the product, divided into a standard portion independent from a shape of the product and a shape dependent portion depending on the shape of the product, a standard portion design data acquisition step of acquiring design data of the standard portion of the retrieved design record for the standard portion of the production process to be designed, and a shape dependent portion designing step of designing the shape dependent portion of the production process to be designed while referring to design data of the retrieved design record, temporarily determining the production process, and sequentially updating the production process in accordance with the progress of the product, whereby the process for producing the shaped material of the product can be designed.

A shaped material production process designing device according to the present invention comprises a process design record memory for storing, in association with a specification including a basic dimension of a product, a design record of a shaped material production process divided into a standard portion independent from a shape of the product and a shape dependent portion dependent on the shape of the product. From this process design record memory, a referenced design record corresponding to a specification of a product to be designed is retrieved.

For a standard portion of the shaped material production process, design data of a standard portion of the retrieved design record is acquired. For a shape dependent portion thereof, once a partial design of the product has been made, a production process design for that part can be temporarily determined while referring to design data of the retrieved design record even though product designing is not complete. Consequently, design of a production process for the shape dependent portion can proceed by sequentially updating the temporarily determined design in accordance with progress of the product, and sequentially enhancing the completion level of the production process design in accordance with progress in product designing, thereby completing design of the entire shaped material production process.

Thus, a shaped material production process can be designed while the product is being designed, and past experience in designing shaped material production processes can be utilized, thereby reducing the time between initiation of product design and completion of the shaped material production process designing.

DESCRIPTION OF THE PREFERRED EMBODIMENT

Figure 1:
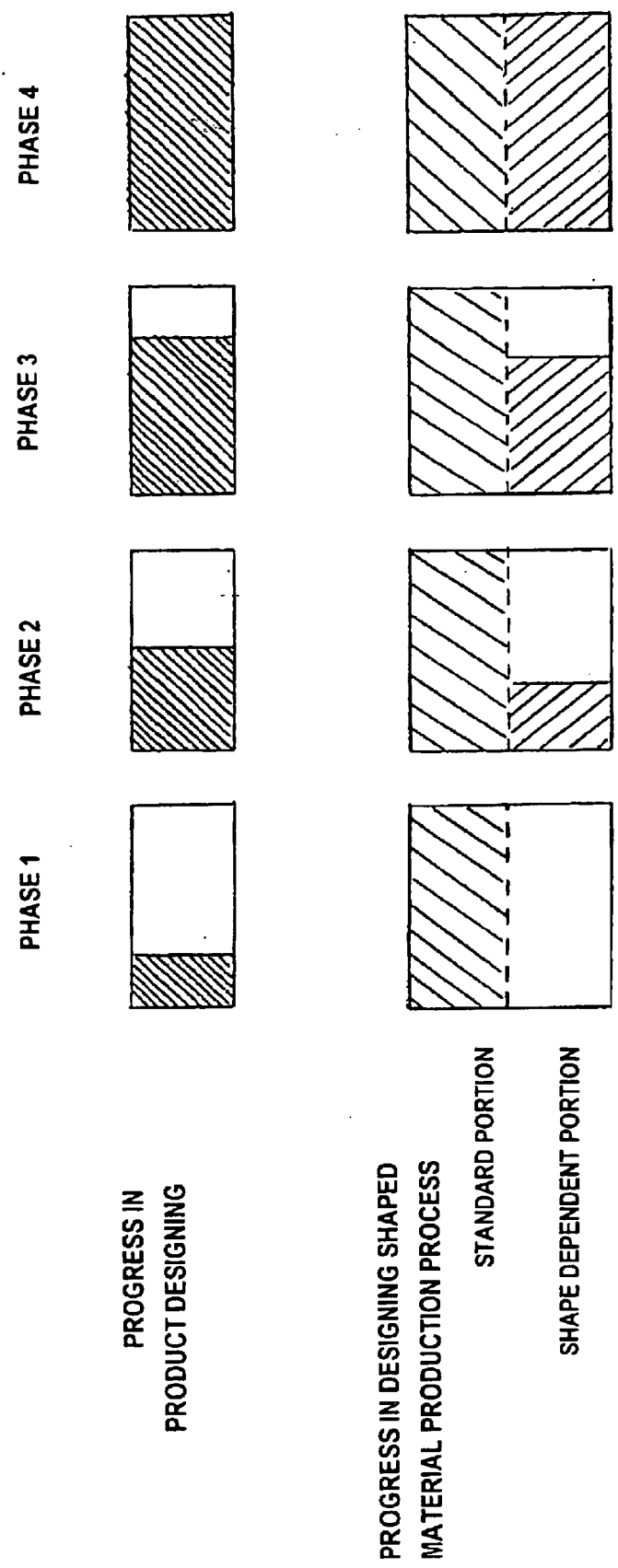
FIG. 1 illustrates a concept of the present invention regarding the relationship between a progress in product designing and a progress in designing a production process for a shaped material.

Referring first to FIG. 1, a concept of the present invention will be described by way of an illustrative preferred embodiment of the invention. FIG. 1 schematically shows relationship between a progress in product designing and a progress in designing a production process for a shaped material. While the progress of product design is divided into four phases for ease of explanation and understanding, it may be divided in any other manner. The present invention is characterized in that design of a process for producing a shaped material is divided into design of a standard portion independent from a shape of a product, and design of a shape dependent portion depending on the shape thereof, as described in detail hereinafter. Further, while design of a product related to an engine of a vehicle and a process for producing a shaped material therefor is described as an example, the present invention can equally be applied to design of other products and processes for a shaped material therefor.

Phase 1 is an initial phase of product design, in which specifications including basic dimensions of a product are determined. In this phase, some of the shaped material production process can be designed. For example, when a product is a crank and the specification for the crank, such as one used in a 3.5 liter V6 gasoline engine, is determined, a past design record can be retrieved from a database where design records of a shaped material production processes for cranks are stored. Even though actual designing of a specific shape of the product has not yet been initiated, data on past production process designs can be used without modification for the standard portion independent from the product shape. Examples of standard portions include a portion whose design is determined by the size of a product, such as a contour design for a structural segment of a die.

Phase 2 is an early phase of product designing in which the product has begun to be specifically designed. In this phase, in the shaped material production process design, some of the process for a shape dependent portion depending on the product shape can be designed. For example, when a contour is roughly determined in an early stage of product design, design data for previously designed shape dependent portions can be retrieved from a database wherein past design records of shaped material production processes for cranks are stored, so that temporary process design for the shape dependent portion can be roughly determined.

Phase 3 is a phase in which product design has considerably progressed. In this phase, the process design temporarily determined in Phase 2 is updated in view of the progress in product design while referring to the past database as in Phase 2. The remaining design is further temporarily determined, thereby enhancing the completion level of the process design.

Phase 4 is a phase in which product designing is completed, and design of the shape dependent portion in the shaped material production designing process is also completed, thereby finishing design of the shaped material production process.

Thus, the concept of the present invention is characterized in that data is retrieved from a database for storing past design records of production processes divided into those for standard portions and for shape dependent portions in association with specifications of a product including basic dimensions. It is also characterized in that, in designing the production process, design data is retrieved for the standard portion, while for the shape dependent portion the process is designed while referring to the retrieved design data, temporarily determining the process, and updating the process in accordance with the progress of the product.

Figure 2:
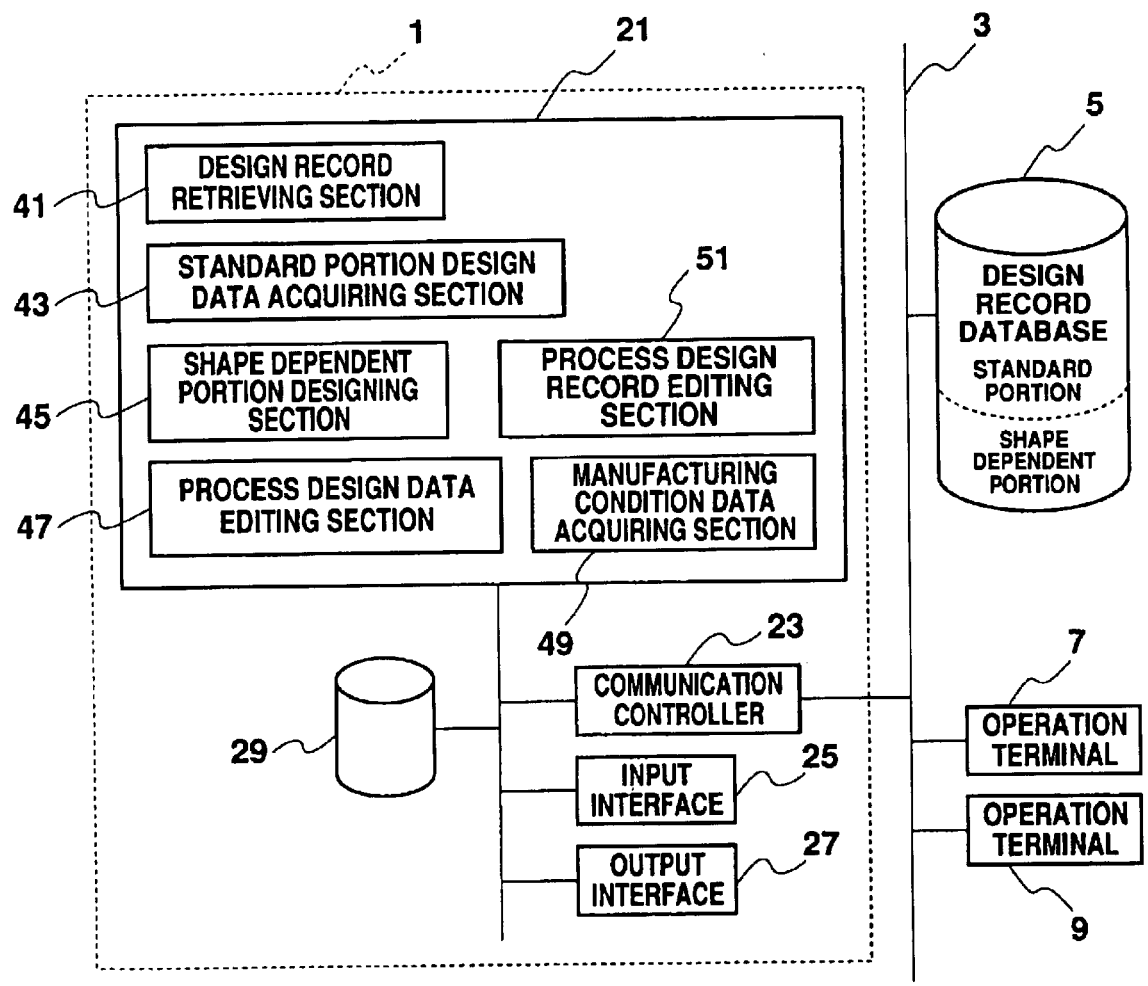
FIG. 2 is a block diagram illustrating a device for designing a production process for a shaped material, and connection of the device through a network to a design record database and an operation terminal according to an embodiment of the present invention.

An embodiment of the present invention will be described in detail with reference to FIG. 2, et seq. FIG. 2 is a block diagram illustrating a device 1 for designing a shaped material production process, and connection of the shaped material production process designing device 1 through a network 3 to a design record database 5 for storing past design records of shaped material production processes, and operation terminals 7 and 9 for the shaped material production process.

The shaped material production process designing device 1 formed by a commonly-used computer includes a CPU 21, a communication controller 23, an input interface 25, an output interface 27, an external storage device 29, interconnected via an internal bus. The communication controller 23 is connected through the network 3 to the external design record database 5, and the external operation terminals 7 and 9. The design records of shaped material production processes may all be stored in the design record database 5, or may be divided and stored in the external storage device 29, and the operation terminals 7 and 9. The design record database 5 may be provided inside the shaped material production process designing device 1.

The CPU 21 includes a design record retrieval section 41 for retrieving a past design record from the design record database 5. From the retrieved past design record, a standard portion design data acquiring section 43 acquires design data of a standard portion independent from the shape of a product in the past processes for producing the shaped material, and a shape dependent portion designing section 45 designs the portion of the shaped material production process depending on the shape of the product. The CPU further includes a process design data editing section 47 for editing design data of the standard portion and a design result of the shape dependent portion.

The CPU further includes a manufacturing condition data acquiring section 49 for acquiring manufacturing condition data as the shaped material production process is implemented at each operation based on the edited process design data, and a process design record editing section 51 for comparing the manufacturing condition data with the process design data, and updating and reediting the process design record. The manufacturing condition data is received by the communication controller 23 from the operation terminals 7 and 9 through the network 3. The process design record edited by the process design record editing section 51 is transmitted by the communication controller 23 through the network 3 to the design recorded database 5, and registered and stored in the database 5 as a new design record.

Figure 3:
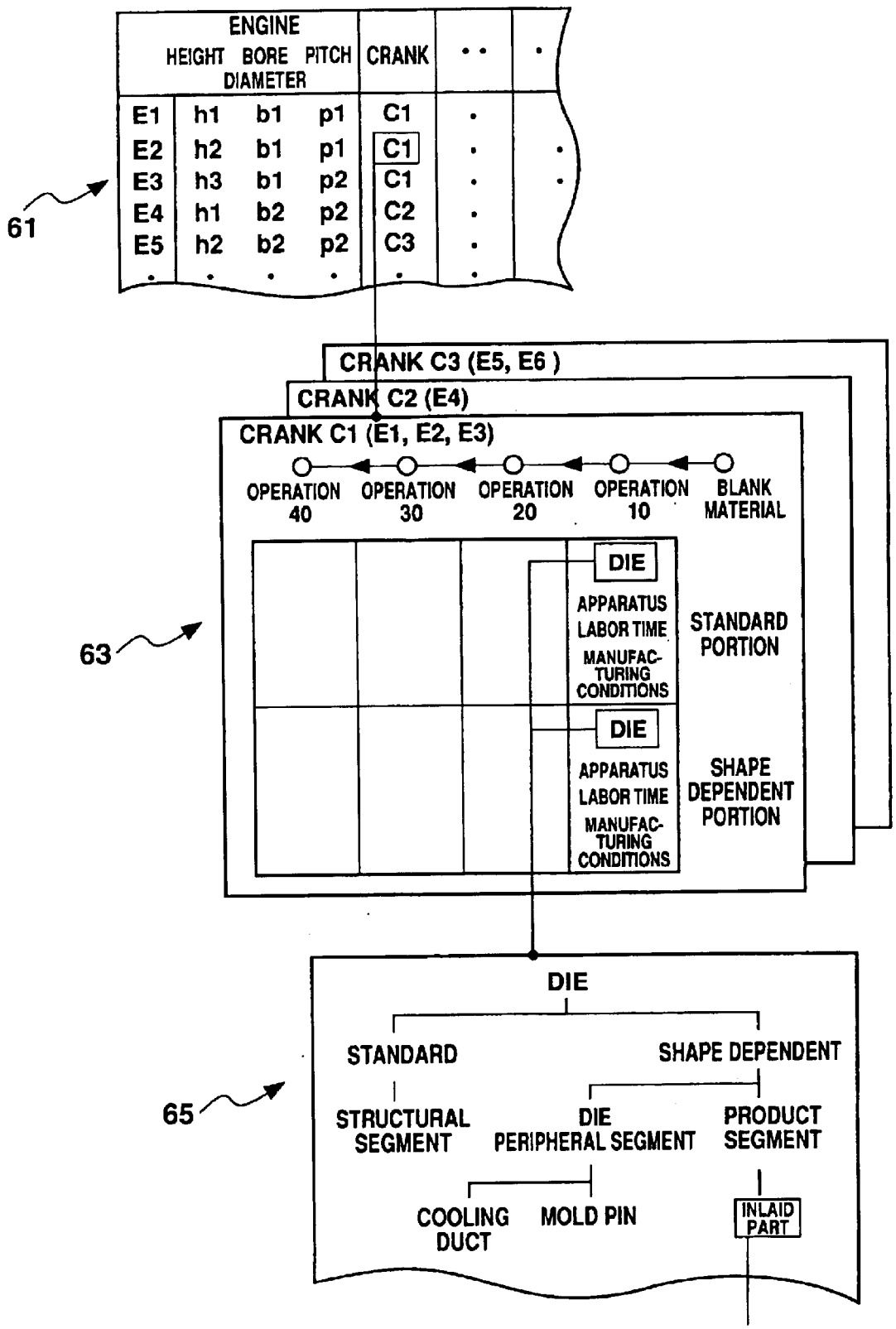
FIG. 3 illustrates an example configuration of data in the design record database according to the embodiment of the present invention.

FIG. 3 illustrates an example of a configuration of data in the design record database. While shaped material production process data related to vehicle engine cranks was described, the content of the design record database is not limited thereto. The design record database for the shaped material production process for cranks is of a hierarchical configuration, and has a configuration in which data is associated with the specifications including basic dimensions of an engine as an example of a product.

First hierarchy data 61 is of a data configuration allowing retrieval of apart number for a crank by specifying basic dimensions associated with the crank, including the height, the diameter of a bore, and the pitch between bores, of an engine E1, E2, E3 or the like. The part number of the associated crank can be retrieved by input of an engine E1, E2, E3 or the like, or by input of basic dimensions, such as, for example, the height, the diameter of a bore, and the pitch. FIG. 3 shows an example wherein a crank C1 is retrieved by input of an engine E2.

Second hierarchy data 63 is of a data configuration allowing retrieval of the past design record data of the shaped material production process for a crank by specifying the part number of the crank. Because the crank C1 is common to the engines E1, E2, and E3, the same design record of the shaped material production process is retrieved for these three engines. The design record of the shaped material production process includes the process design records of dies, apparatuses, labor in terms of time, manufacturing conditions, and the like for each operation of the production process.

Characteristically, the design record is stored using a data configuration in which the process design records of the dies, apparatuses, labor in terms of time, manufacturing conditions, and the like are divided into those of a standard portion independent from the shape of a product, and those of a shape dependent portion depending on the shape. Therefore, this data configuration allows retrieval of third hierarchy data and other data by specifying any of the operation number, the choice of a standard portion or a shape dependent portion, the die, apparatus, manufacturing conditions, and the like. FIG. 3 shows an example where the third hierarchy data 65 is retrieved by input of the operation number 10, and dies for a standard portion and a shape dependent portion.

The third hierarchy data 65 is data indicating a structure of design record data. The data is configured such that, by specifying a portion to be designed, detailed design data of the specified portion can be retrieved as fourth hierarchy data. FIG. 3 shows an example where a search is made for an inlaid part, and detailed data in the design record of the inlaid part, such as a drawing illustrating a shape, dimensions, and the like, can be obtained as the fourth hierarchy data.

While the data in four hierarchies are used in the above description, a smaller or larger number of hierarchies are also possible. Further, the data configuration is not limited to that described above, and may be replaced by any other configurations. While the description herein focuses on the contour design data for a die as a specific example, details of the past design record can be retrieved for other factors, such as manufacturing conditions for producing a shaped material from a blank material using a die, utilizing the hierarchy data configuration.

Figure 4:
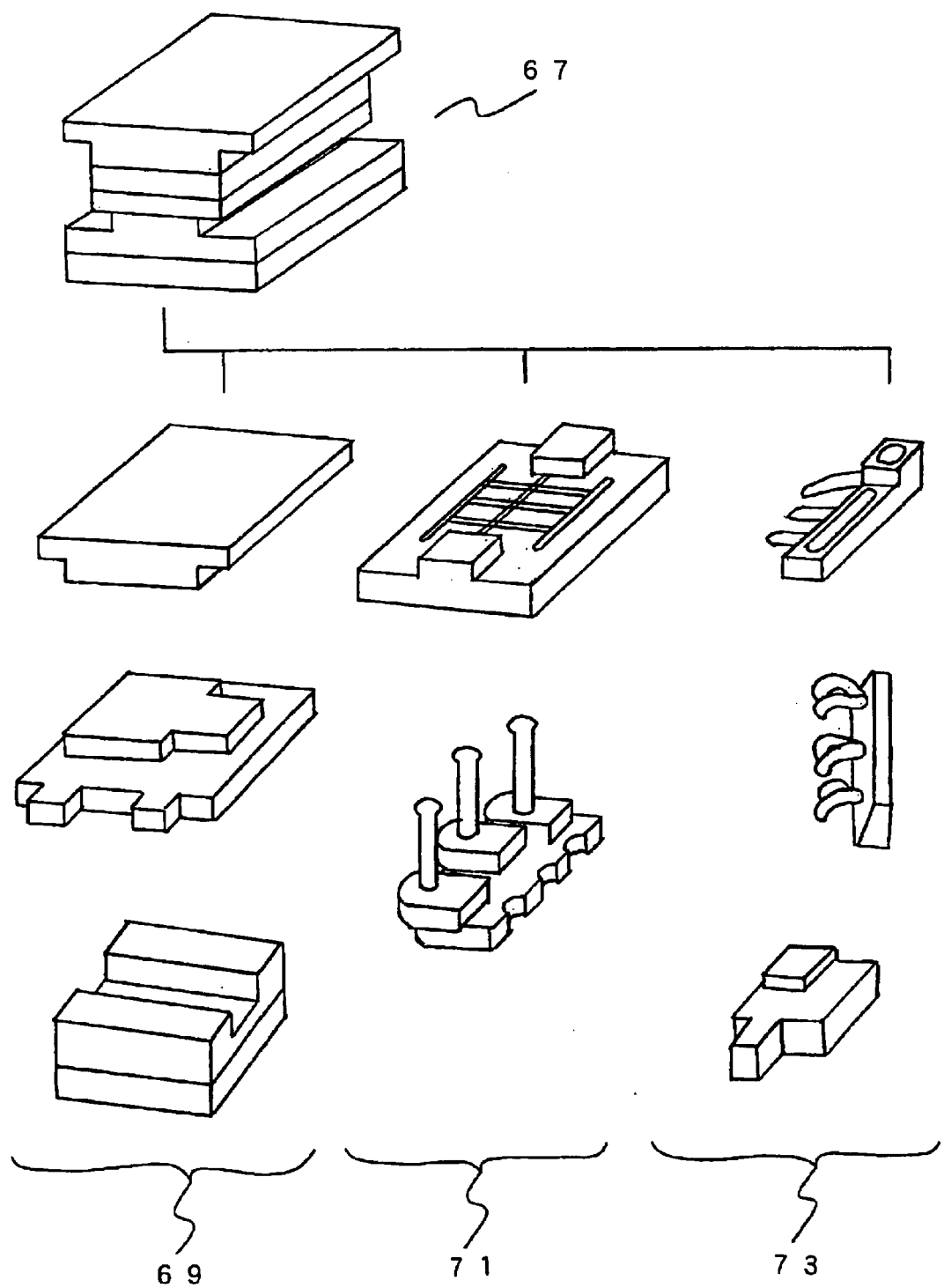
FIG. 4 is a perspective view illustrating segments of a die as an example of design record database data according to the embodiment of the present invention.

FIG. 4 illustrates contour shapes as examples of data in the fourth hierarchy retrieved by specifying each portion of a die in the third data hierarchy 65. The entire die 67 is composed of a structural segment 69 which is a standard portion, a die peripheral segment 71 which is a shape dependent portion including a relatively large proportion of a standard portion, and a product segment 73 highly dependent on the shape. Thus, in the construction of a die for a crank of the particular type determined by basic dimensions of the product, i.e. crank C1 in this example, the structural segment of the die defining the structure of the die has a certain shape independent from small details of the product shape. On the other hand, the segment of the crank C1 varied with the shape is a product segment, such as inlaid parts, and therefore has a shape in accordance with the product shape. The peripheral segments, such as cooling ducts and mold pins, have the intermediate characteristics, and therefore include a relatively large proportion of a standard portion in shape.

Thus, the design record database stores past design records of a shaped material production processes divided into standard portions independent from the shape of a product and shape dependent portions which depend on the product shape, all in association with specifications including basic dimensions of the product. The shaped material production process data includes, in addition to the contour drawing data of dies described above, information on associated apparatus, labor in terms of time, manufacturing conditions, and the like.

Figure 5:
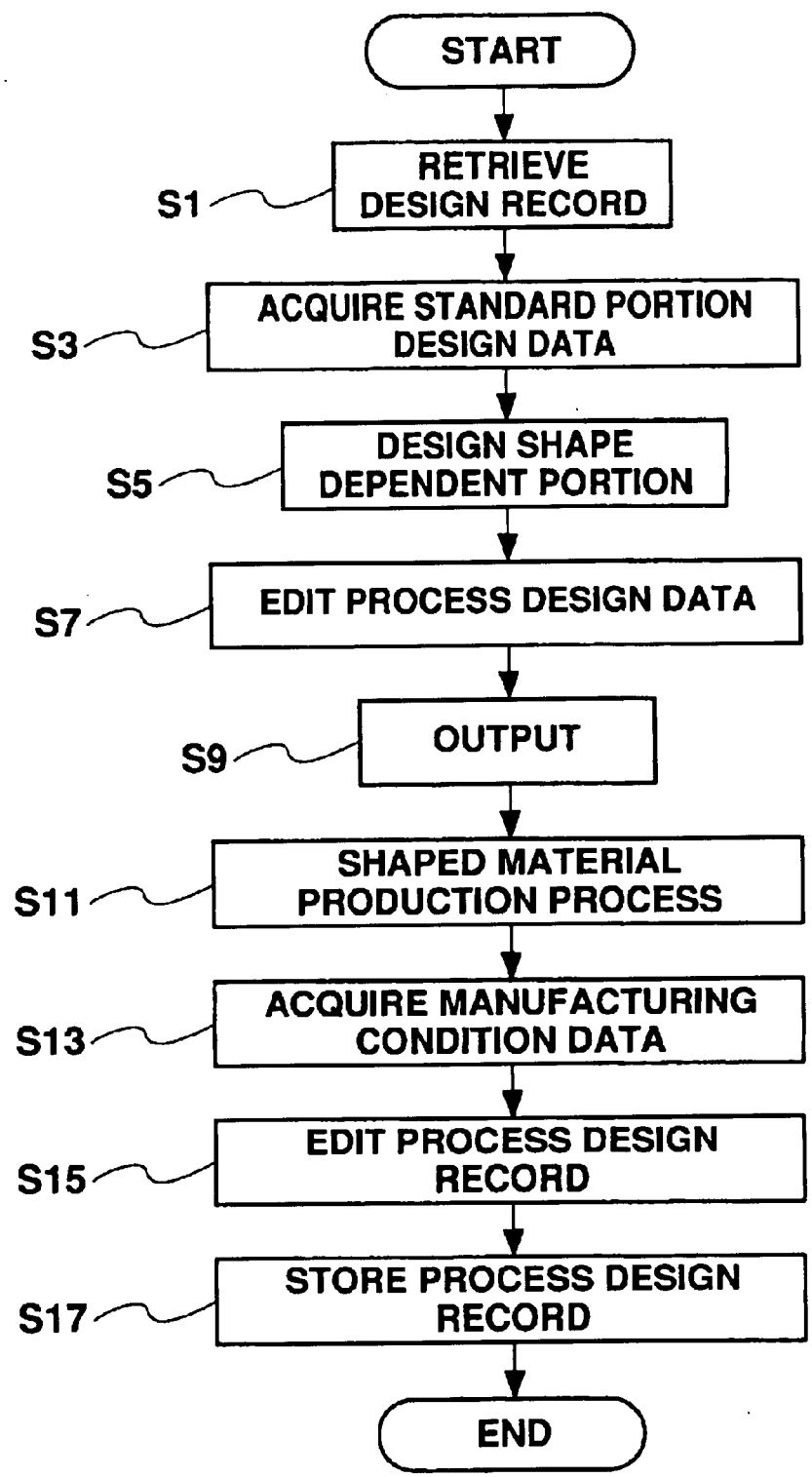
FIG. 5 is a flowchart showing a procedure for designing a shaped material production process according to the embodiment of the present invention.

FIG. 5 is a flowchart showing a procedure for designing a shaped material production process in accordance with the configuration shown in FIG. 2. At a design record retrieving step S1, the design record retrieving section 41 of the CPU 21 retrieves a design record to be referenced for a shaped material production process to be designed through the communication controller 23 and the network 3 from the design record database 5. More specifically, using the data hierarchical configuration, a design record with the same basic dimensions with the object to be designed is retrieved using as a key the specifications including the basic dimensions of the product. When no design record with the same basic dimension can be found, the design record with the closest basic dimensions can be retrieved. The data hierarchical configuration can be utilized as in the examples described with reference to FIGS. 3 and 4.

At a standard portion design data acquiring step S3, the standard portion design data acquiring section 43 acquires detailed design data of a standard portion from the retrieved design record data. For example, detailed design data of a structural segment of a die may be acquired.

Thus, of the shaped material production process data, design data of a standard portion independent from the product shape can be acquired when the specifications including basic dimensions of a product are determined, i.e. when product designing is initiated. As a result, the shaped material production process can be designed while a product is being designed, so that past experiences in designing the shaped material production processes can be utilized, thereby reducing the period between initiation of product designing and completion of the shaped material production process designing.

At a shape dependent portion designing step S5, the shape dependent portion designing section 45 proceeds with design while referring to design data of the retrieved design record, temporarily determining and updating a production process in accordance with the progress of the product. When a contour of, for example, inlaid parts of a die is roughly determined at an early stage of product designing, design data on inlaid parts are retrieved among the design data on the shape dependent portions in past design records, and the process design can be roughly determined on a temporary basis. As product designing further proceeds, the temporarily determined process design is updated in accordance with the progress in product designing while referring to the past record database, thereby enhancing the completion level of the process design. By defining standard reference procedure, design can be completed more easily and in a shorter time.

As described above, the shape dependent portion depending on the product shape can be designed while referring to past design records among the shaped material production process data while the shape of the product is being designed in product designing. As a result, the shaped material production process can be designed in parallel to product design, thereby allowing utilization of the past experiences in designing the shaped material production processes, and therefore reducing the period between initiation of product designing and completion of the shaped material production process designing.

At a process design data editing step S7, the process design data editing section 47 edits design data of the standard portion and the design result of the shape dependent portion. The edited process design data includes not only design data of a die but also design data of apparatus, labor in terms of time, manufacturing conditions, and the like. The edited result is transmitted through the communication controller 23, the network 3 to the operation terminals 7 and 9 for each operation of the shaped material production process at an output step S9.

At a shaped material production process step S11, the shaped material production process is implemented at each operation of the shaped material production process in accordance with the output process design data. More specifically, the die, apparatus, and the like designed in accordance with the process design data are prepared, and the blank material goes through each operation under the manufacturing conditions determined by the process design data, thereby producing a shaped product. The manufacturing conditions in this manufacturing process are obtained at each operation, and transmitted from each of the operation terminals 7 and 9 through the network 3 and the communication controller 23 to be acquired by the manufacturing condition data acquiring section 49 at a manufacturing condition data acquiring step S13.

At a process design record editing step S15, the process design record editing section 51 compares the manufacturing condition data acquired at the manufacturing condition data acquisition step S13 and the manufacturing conditions in the previously acquired process design data, and updates and edits the process design data under the new manufacturing conditions as a new process design record.

At a process design record storing step S17, the new process design record edited at the process design record editing step S15 is transmitted through the communication controller 23 and the network 3 to the design record database 5 for registering and storing the record.

Thus, by acquiring the actual manufacturing conditions and reediting the process design data, data can be constantly updated to reflect new design experience and this updated data can be utilized to understand the manufacturing conditions of the shaped material production process, thereby reducing the time between initiation of product designing and completion of the shaped material production process designing.

What is claimed is:

1. A shaped material production process designing device for shaping a blank material using a die to thereby produce a shaped material for creating a contour of a product, comprising:

a design record memory for storing, in association with a specification including a basic dimension of a product, design record data of a shaped material production process, the design record data including design record data concerning a contour of a die, the design record data concerning the contour of a die including design record data concerning a contour of a structural segment of the die, which is independent from a product shape and defines a structure of the die, and design record data concerning a contour of an inlaid part, which has a shape in accordance with the product shape;

a die structural segment data acquiring section for acquiring the design record data concerning the contour of the structural segment of the die in an initial phase in which a specification including a basic dimension of a product is determined, through retrieval from the design record memory, using the determined specification including the basic dimension of the product as a retrieving key; and a die inlaid part data acquiring section for acquiring the design record data concerning the contour of the inlaid part of the die in a subsequent phase in which the product has begun to be specifically designed and the contour of the product is determined, through retrieval from the design record memory, using the specification including the basic dimension of the product as a retrieving key, wherein the acquired design record data concerning the structural segment of the die and the acquired design record data concerning the contour of the inlaid part of the die are edited to create a contour of an entire die.

2. The shaped material production process designing device according to claim 1, wherein the design record data further includes design record data concerning a manufacturing condition for producing a shaped material using a die, the design record data concerning a manufacturing condition including design record data concerning a manufacturing condition independent from the product shape, and design record data concerning a manufacturing condition in accordance with the product shape;

wherein the shaped material production process designing device further comprises:

a standard portion data acquiring section for acquiring standard portion design record data concerning a manufacturing condition independent from the product shape in the initial phase, through retrieval from the design record memory, using the determined specification including the basic dimension of the product as a retrieving key; and a shape dependent portion data acquiring section for acquiring shape dependent portion design record data concerning a manufacturing condition in accordance with the product shape in the subsequent phase, through retrieval from the design record memory, using the specification including the basic dimension of the product as a retrieving key; and wherein the acquired standard portion design record data and the acquired shape dependent portion design record data are edited to create an entire manufacturing condition of the shaped material.

3. A shaped material production process designing method for shaping a blank material using a die to thereby produce a shaped material for creating a contour of a product, while using a design record database for storing, in association with a specification including a basic dimension of a product, design record data for a shaped material production process, the design record data including design record data concerning a contour of a die, the design record data concerning the contour of a die including design record data concerning a contour of a structural segment of the die, which is independent from a product shape and defines a structure of the die, and design record data concerning a contour of an inlaid part, which has a shape in accordance with the product shape, the shaped material production process design method, comprising:

a die structural segment data acquiring step of acquiring the design record data concerning the contour of the structural segment of the die in an initial phase in which a specification including a basic dimension of a product is determined, through retrieval from the design record memory, using the determined specification including the basic dimension of the product as a retrieving key; and a die inlaid part data acquiring step of acquiring the design record data concerning the contour of the inlaid part of the die in a subsequent phase in which the product has begun to be specifically designed and the contour of the product is determined, through retrieval from the design record memory, using the specification including the basic dimension of the product as a retrieving key, wherein the acquired design record data concerning the structural segment of the die and the acquired design record data concerning the contour of the inlaid part of the die are edited to create a contour of an entire die.

4. The shaped material production process designing method according to claim 3, in which the design record data further includes design record data concerning a manufacturing condition for producing a shaped material using a die, the design record data concerning a manufacturing condition including design record data concerning a manufacturing condition independent from the product shape, and design record data concerning a manufacturing condition in accordance with the product shape, the shaped material production process designing method further comprising:

a standard portion data acquiring step of acquiring standard portion design record data concerning a manufacturing condition independent from the product shape in the initial phase, through retrieval from the design record database, using the determined specification including the basic dimension of the product as a retrieving key; and a shape dependent portion data acquiring step of acquiring design dependent portion design record data concerning a manufacturing condition in accordance with the product shape in the subsequent phase, through retrieval from the design record database, using the specification including the basic dimension of the product as a retrieving key, wherein the acquired standard portion design record data and the acquired shape dependent portion design record data are edited to create an entire manufacturing condition of the shaped material.

* * * * *